United States Patent
Breun et al.

(10) Patent No.: US 12,209,669 B2
(45) Date of Patent: Jan. 28, 2025

(54) MECHANICAL SEAL ASSEMBLY WITH ABRASION OPTIMIZATION

(71) Applicant: EagleBurgmann Germany GmbH & Co. KG, Wolfratshausen (DE)

(72) Inventors: Sylvia Breun, Berg (DE); Christian Eisfeld, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 17/917,840

(22) PCT Filed: Mar. 16, 2021

(86) PCT No.: PCT/EP2021/056621
§ 371 (c)(1),
(2) Date: Oct. 7, 2022

(87) PCT Pub. No.: WO2021/213736
PCT Pub. Date: Oct. 28, 2021

(65) Prior Publication Data
US 2024/0384796 A1    Nov. 21, 2024

(30) Foreign Application Priority Data
Apr. 21, 2020   (DE) ...................... 10 2020 110 776.5

(51) Int. Cl.
*F16J 15/34*    (2006.01)
(52) U.S. Cl.
CPC ................... *F16J 15/3452* (2013.01)
(58) Field of Classification Search
CPC .... F16J 15/00; F16J 15/16; F16J 15/50; F16J 15/52; F16J 15/3634; F16J 15/3452; F16J 15/3464
USPC .......................................... 277/379
See application file for complete search history.

(56) References Cited

U.S. PATENT DOCUMENTS

| | | | | |
|---|---|---|---|---|
| 4,722,534 A | * | 2/1988 | Wentworth | F16J 15/3464 277/306 |
| 4,971,337 A | * | 11/1990 | Hufford | F16J 15/3464 277/390 |
| 2002/0074728 A1 | * | 6/2002 | Kraus | F16J 15/3452 277/353 |

(Continued)

FOREIGN PATENT DOCUMENTS

| DE | 102013005926 A1 | 10/2014 |
|---|---|---|
| EP | 1630463 A1 | 3/2006 |

OTHER PUBLICATIONS

International Search Report issued in PCT/EP2021/056621, dated Jun. 7, 2021.

*Primary Examiner* — Nathan Cumar
(74) *Attorney, Agent, or Firm* — Locke Lord LLP; Scott D. Wofsy

(57) ABSTRACT

The invention relates to a mechanical seal assembly comprising a mechanical seal (2) having a rotating slide ring (3) with a sliding surface (3a) and a stationary slide ring (4) with a sliding surface (4a) defining a sealing gap (5) therebetween, wherein one of the slide rings is designed as a wearing slide ring and has a hardness lower than the other one of the slide rings, wherein the wearing slide ring has a base area (30a) and a wear area (30b), and wherein the wear area (30b) has an at least partially non-cylindrical area in the axial direction (A) of the mechanical seal assembly.

11 Claims, 5 Drawing Sheets

(56) References Cited

U.S. PATENT DOCUMENTS

Figure 1:
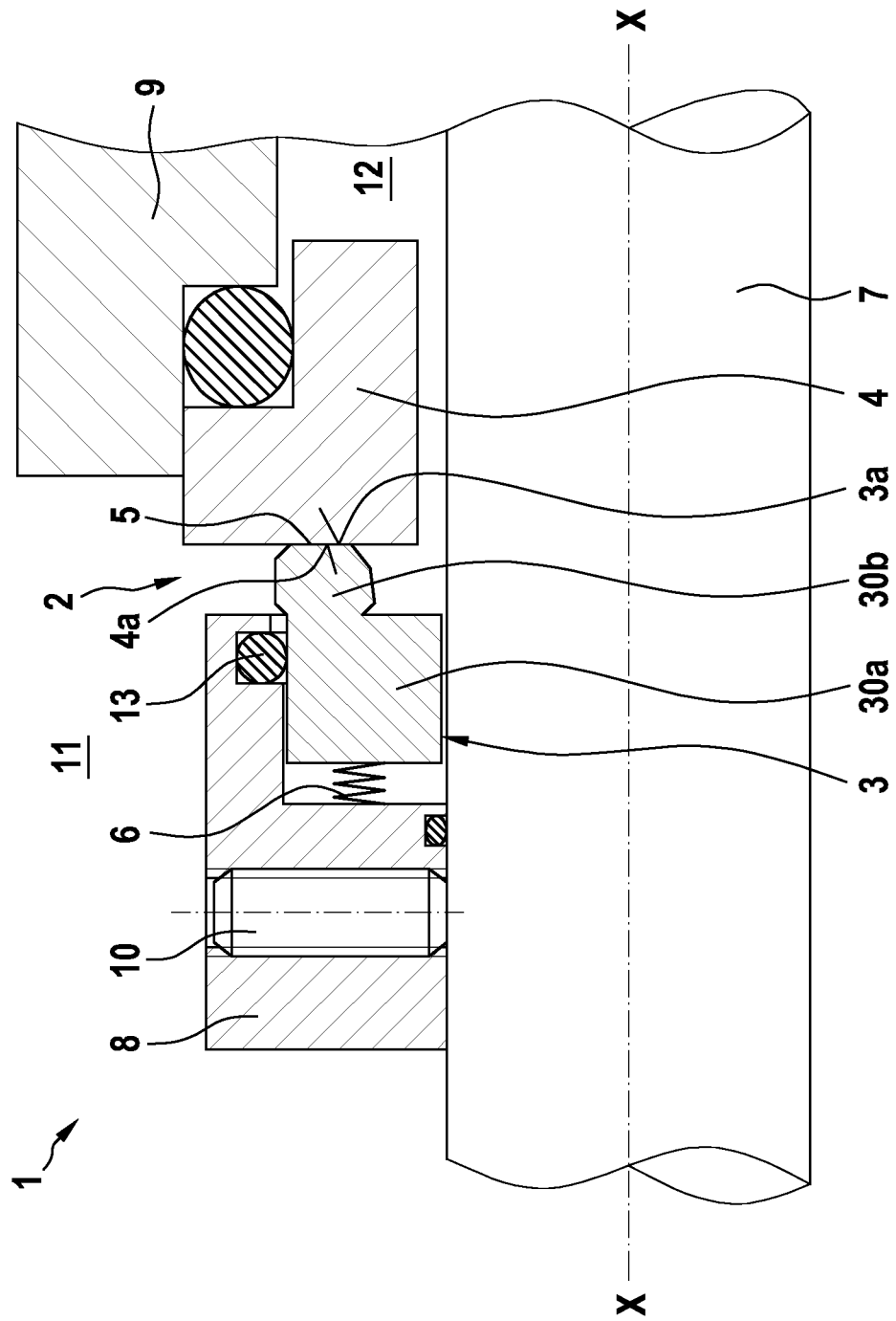

2006/0038353 A1* 2/2006 Murakami ............ F16J 15/348
                                                       277/399
2016/0053895 A1* 2/2016 Otschik ............... F16J 15/3496
                                                       277/405

* cited by examiner

MECHANICAL SEAL ASSEMBLY WITH ABRASION OPTIMIZATION

CROSS-REFERENCE TO RELATED APPLICATIONS

This application is a U.S. National Phase Application filed under 35 U.S.C. § 371, based on International Patent Application No. PCT/EP2021/056621, filed Mar. 16, 2021, which claims priority to German Patent Application No. 10 2020 110 776.5, filed on Apr. 21, 2020, which are incorporated herein by reference.

The present invention relates to a mechanical seal assembly having selectively adjustable wear behavior.

Mechanical seal assemblies are known from prior art in various designs. When designing mechanical seal assemblies, a compromise must be found between minimum leakage and acceptable wear of the sliding surfaces. Furthermore, economic optimization with regard to manufacturing costs and operating costs must be found for a user of the mechanical seal assembly. In pumps or agitators, for example, slide ring seals are used in which one of the slide rings is made of a material which is harder than the other one of the slide rings. The slide ring which is lower in hardness is designed as a mechanical wearing seal that includes wearing allowance in the form of a ring-cylindrical wear area at a base region. The mechanical seal will then be in use until the ring-cylindrical wear area is worn out. The material pairing used herein is, for example, silicon carbide for the slide ring the hardness of which is higher and carbon graphite for the slide ring the hardness of which is lower. However, the problem with mechanical seal assemblies of this type is that stress and relief in the sealing gap between the two sliding surfaces of the slide rings continuously change due to wear. As a result, the wear behavior of the mechanical seal assembly also changes over time. However, this makes it extremely difficult, for example, to determine any replacement time for the worn out slide ring.

It is therefore the object of the present invention to provide a mechanical seal assembly having simple design and simple, inexpensive manufacturability which is used to selectively determine the slide ring wear behavior.

This object will be achieved by a mechanical seal assembly having the features of claim 1. The subclaims show preferred further embodiments of the invention.

The mechanical seal assembly according to the invention having the features of claim 1 has the advantage that selective wear behavior adjustment of a slide ring is possible. The mechanical seal assembly comprises a mechanical seal with a rotating slide ring and a stationary slide ring, which have a sealing gap between their sliding surfaces. One of the two slide rings is designed as a wearing slide ring having a hardness lower than the other one of the slide rings. The slide ring which is lower in hardness has a base region and a wear area, which is also called wearing allowance. The sliding surface of this wearing slide ring is located at the wear area. The wear area of this wearing slide ring has an at least partially non-cylindrical region in the axial direction of the mechanical seal assembly. Thus, according to the invention, the wear area of the slide ring the hardness of which is lower is no longer ring-cylindrical in shape, i.e. having a constant outer diameter and constant inner diameter, but the outer diameter and/or inner diameter changes in the axial direction in at least a portion of the wear area. This increases manufacture cost of the slide ring, since the simple geometric, ring-cylindrical shape of the wear area is no longer selected, but individually fitted geometric designs are provided depending on the application. Nevertheless, a wearing slide ring designed in this way has improved performance, since especially the wear behavior can also be adapted as a function of wear that has already occurred and thus, for example, the changing load forces on the sliding surfaces. Thus, when using a mechanical seal with hard-soft pairing in the slide rings, selective wear behavior can be realized by geometrically adapting the slide ring the hardness of which is lower and having a shape that deviates from a ring cylinder.

Preferably, the non-cylindrical region of the wear area has a changing, annular cross-sectional region in the axial direction of the mechanical seal assembly such that at least an outer diameter of the wear area and/or an inner diameter of the wear area each changes in the axial direction. Thus, the non-cylindrical region can be realized by either changing an outer diameter while keeping the inner diameter constant or changing the inner diameter while keeping the outer diameter constant or changing both the outer and inner diameters.

According to another preferred embodiment of the invention, the wear area comprises a partially cylindrical region. That is, the wear area is partially cylindrical and partially non-cylindrical. Alternatively, the entire wear area is configured with a cross-sectional area that is changing in the axial direction.

Preferably, the wearing slide ring has a first portion which directly adjoins the sliding surface of the wearing slide ring and has a changing, annular cross-sectional region. The geometric shape of the first section is preferably selected such that relatively rapid wear occurs on the first section to allow rapid run-in of the sliding ring pair on the sliding surfaces. In particular, this allows any waviness in the sliding surfaces to be quickly compensated for by wear of the slide ring the hardness of which is lower.

Further preferably, the first section of the wear area is immediately followed by a second section, which is to define the actual wear behavior through operation of the mechanical seal assembly. The second section thus represents the normal functionality of the wear area. For example, the second portion may also be formed as a cylindrical ring with a constant outer diameter and a constant inner diameter in the axial direction. Alternatively, the second portion may also be formed with outer diameters and/or inner diameters changing in the axial direction. In this way, especially a change in a load force on the sliding surfaces can be compensated for, so that the forces occurring at the sliding surfaces remain as constant as possible during the service life of the mechanical seal assembly to keep the sealing gap between the sliding surfaces as constant as possible in the radial direction.

Preferably, the wear area comprises a third section which directly adjoins the second section in the axial direction. The third section also has a varying, annular cross-sectional area.

Preferably, the first section has a cross-sectional area that widens starting from the uniform area.

Particularly preferably, the outer diameter and inner diameter at the first section are designed such that they linearly increase or decrease. In this way, for example, a conical first section can be realized if the angles for the outer diameters and inner diameters are selected to be the same. However, it is also possible for the outer diameter of the first portion to increase with a constant first angle $\alpha$ and for the inner diameter of the first portion to decrease with a second angle $\beta$, the first and second angles being different. This results in an oblique cone for the first section in longitudinal cut. Particularly preferably, the second angle is greater than the first angle, with neither angle being 45°.

Alternatively, the first portion increases or decreases in size at the outer diameter and/or inner diameter in an arcuate manner, for example in a parabolic manner. It is also possible for either the outer diameter or the inner diameter to linearly change, and for the other of the two diameters to arcuately change.

It should be noted that a production-related chamfer of one or a few tenths of a millimeter can also be provided at the edges at the transition between the sliding surface and the first section, but these are provided for edge protection of the slide ring at the sliding surface and not for the defined wear behavior of the wear area according to the invention. Such production-related chamfers can always be provided for at the transition between the sliding surface and the first section.

According to another alternative embodiment of the invention, the wear area has at least one portion the cross-sectional area of which remains constant in an axial direction, but the outer diameter and the inner diameter continuously change in the axial direction, for example continuously increasing or continuously decreasing. Thus, a parallelogram-like shape is created for this section in longitudinal cut.

Preferably, the third portion of the wear area is formed such that the behavior of the mechanical seal assembly indicates an end of a service life approaching, for example by a sudden increase in leakage, to indicate the need of replacing parts of the mechanical seal assembly. This can especially prevent the harder slide ring from bumping against a slide ring carrier or the like, for example, if the mechanical seal assembly is used for a time that is excessively long.

Further preferably, the complete wearing slide ring is made of a material comprising graphite and/or plastic. This allows the wearing slide ring to have a relatively low hardness so as to exhibit the specifically adjustable wear behavior.

The harder one of the slide rings is preferably made of a ceramic material or a hard metal.

Figure 2:
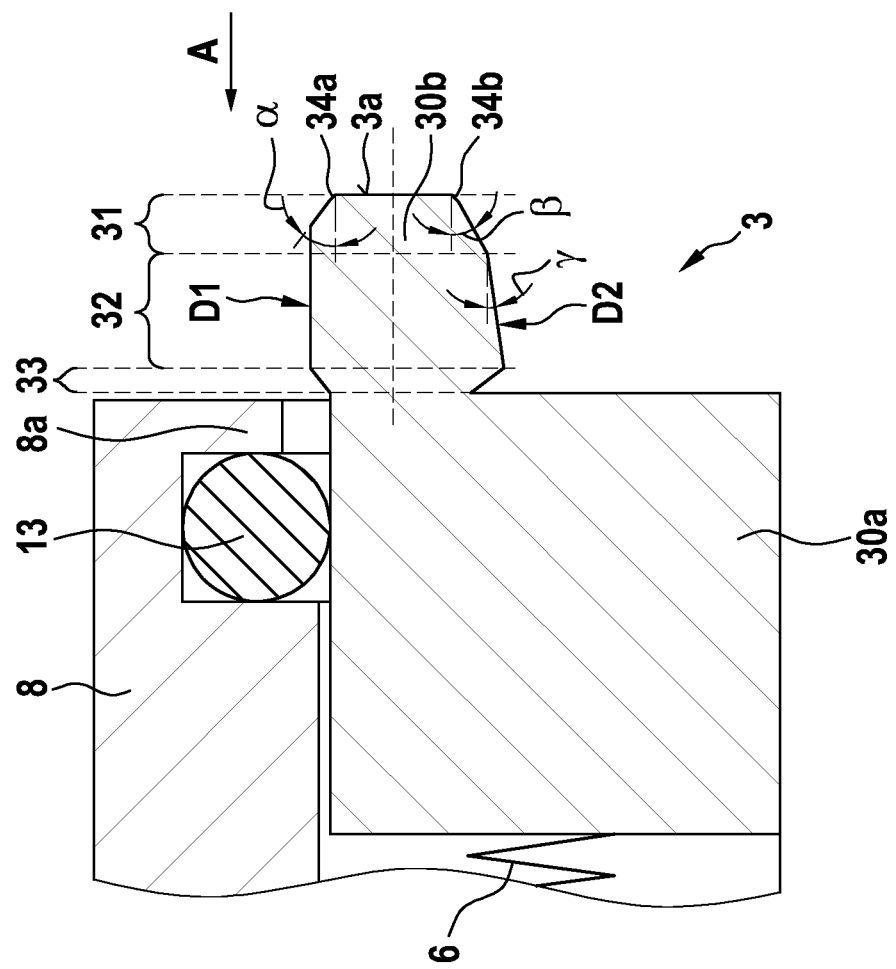
Figure 3:
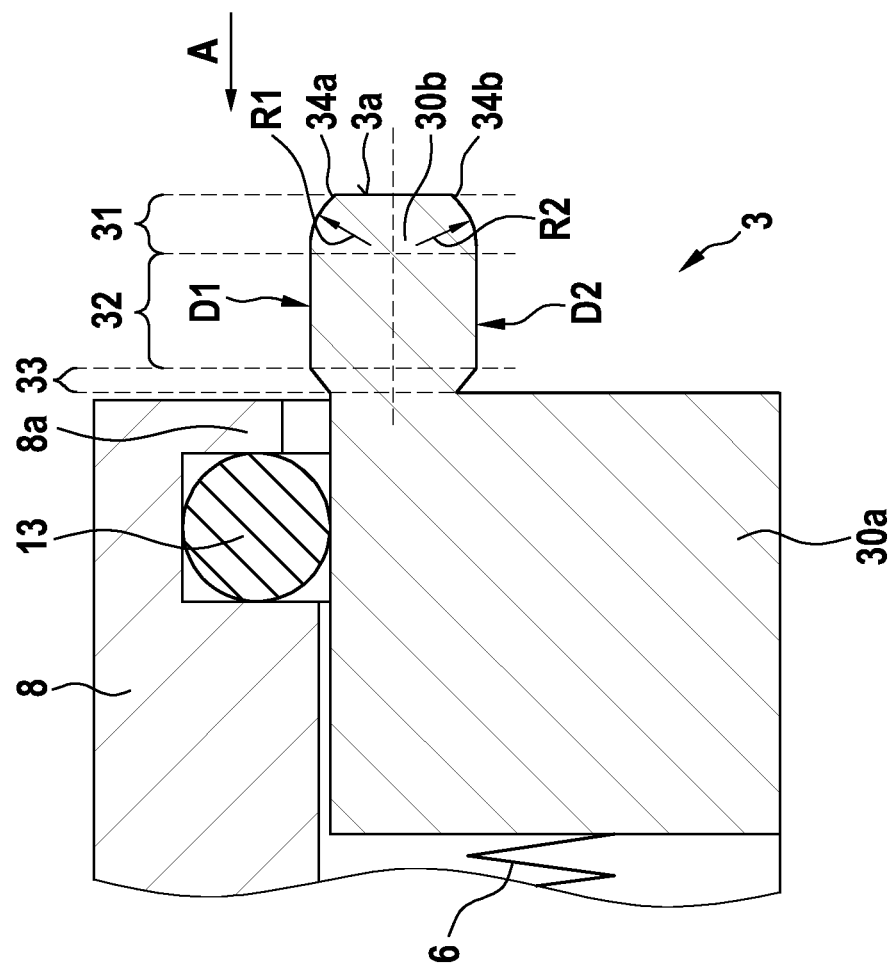
Figure 4:
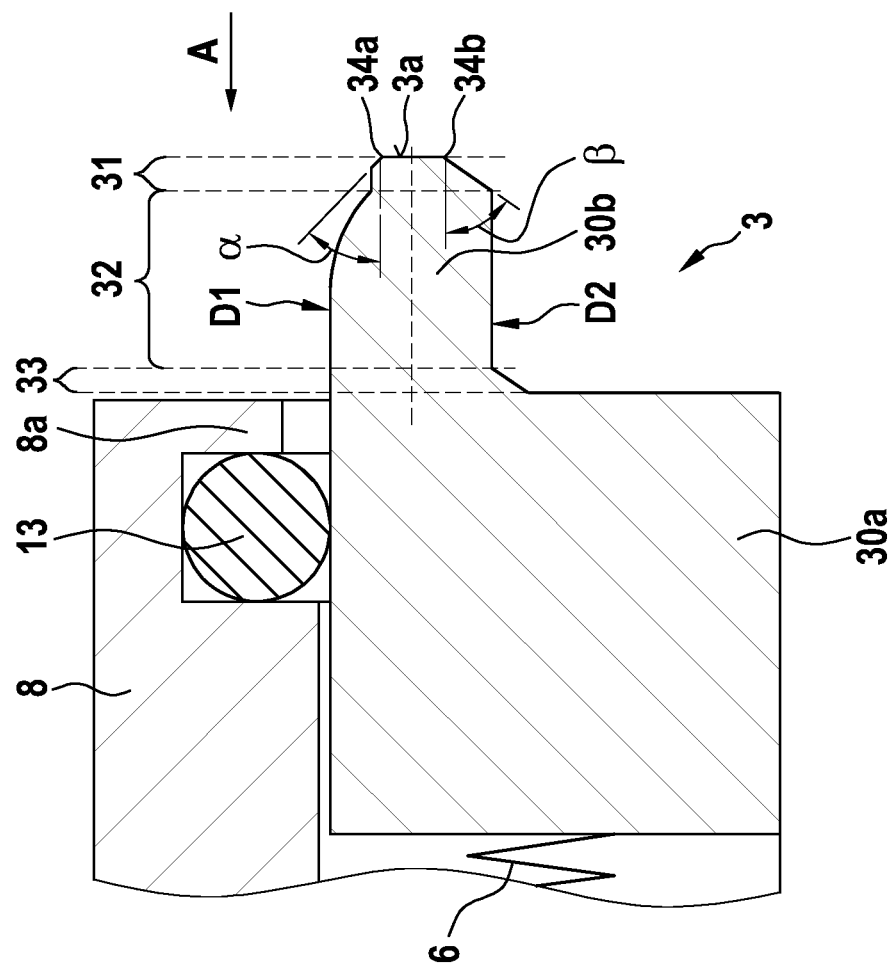
Figure 5:
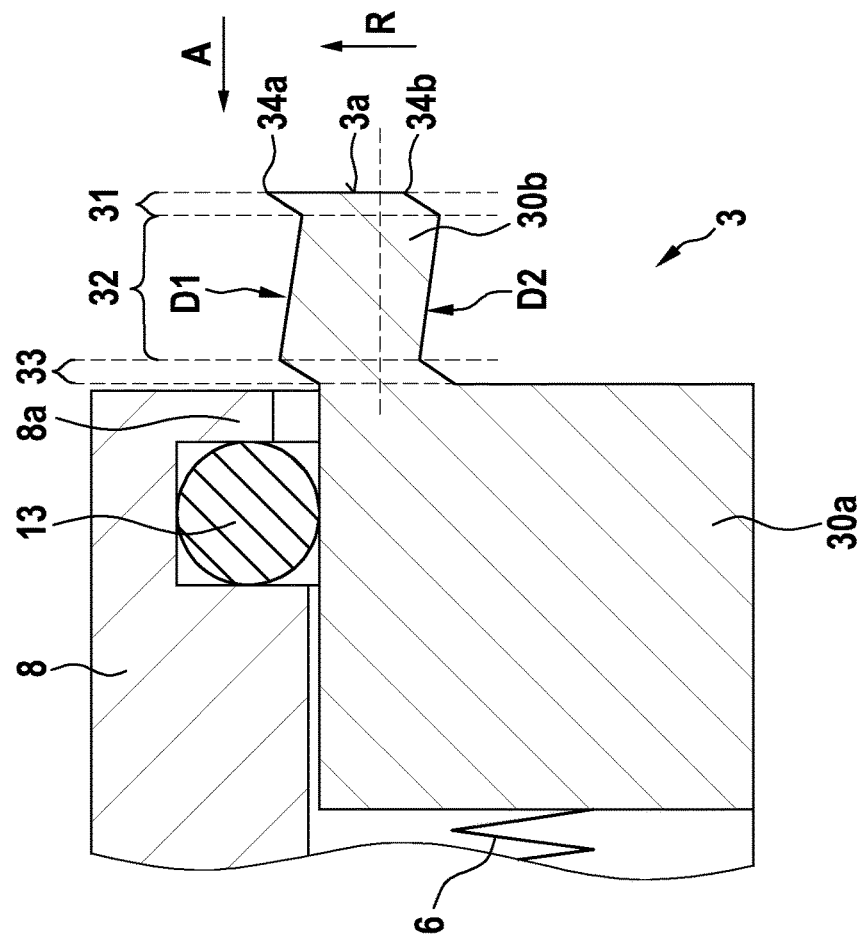

Preferred examples embodiments of the invention are described in detail below with reference to the accompanying drawing, wherein:

FIG. 1 is a schematic sectional view of a mechanical seal assembly according to a first example embodiment of the invention, FIG. 2 is a schematic partial sectional view of the mechanical seal assembly of FIG. 1, FIG. 3 is a schematic partial sectional view of a mechanical seal assembly according to a second example embodiment of the invention, FIG. 4 is a schematic partial sectional view of a mechanical seal assembly according to a third example embodiment of the invention, and FIG. 5 is a schematic partial sectional view of a mechanical seal assembly according to a fourth example embodiment of the invention.

Hereinafter, a mechanical seal assembly 1 according to a first preferred example embodiment of the invention is described in detail, while making reference to FIGS. 1 and 2.

As may be seen from FIG. 1, the mechanical seal assembly 1 comprises a mechanical seal 2 having a rotating slide ring 3 with a first sliding surface 3a and a stationary slide ring 4 with a second sliding surface 4a. A sealing gap 5 is formed between the rotating slide ring 3 and the stationary slide ring 4. The mechanical seal 2 seals a product region 11 from an atmospheric region 12.

The stationary slide ring 4 is arranged on a housing 9.

The rotating slide ring 3 is fixed to a rotating shaft 7 using a slide ring carrier 8. The slide ring carrier 8 is fixed to the shaft 7 using a screw 10. The torque of the shaft is transmitted to the rotating slide ring 3 via the slide ring carrier 8 and a secondary seal 13.

As may be seen from FIG. 1, the rotating slide ring 3 has a base area 30a and a wear area 30b. Furthermore, a pretensioning device 6 is provided on the rotating slide ring.

The rotating slide ring 3 has a hardness lower than the stationary slide ring 4. The rotating slide ring 3 is preferably made of carbon graphite. The stationary slide ring 4 is preferably made of silicon carbide or any hard metal. Thus, the mechanical seal 2 comprises a hard-soft pairing. The wear area 30b is intentionally provided for any wear occurring during operation, and in prior art, the wear area 30b is usually annular-cylindrical in shape with a constant inner diameter and a constant outer diameter.

However, as may be seen in detail from FIG. 2, according to the invention, the wear area 30b is divided into a first section 31, a second section 32 and a third section 33.

As may be seen from FIG. 2, the first section 31 is immediately adjacent to the sliding surface 3a of the rotating slide ring 3, with a first chamfer 34a formed on an outer periphery of the sliding surface 3a and a second chamfer 34b formed on an inner periphery of the sliding surface 3a. The chamfers 34a, 34b have a size of one or a few tenths of a millimeter, for example 0.1 mm. The two chamfers 34a and 34b are due to manufacturing and protect the sliding surface 3a from accidental damage. Typically, the first and second chamfers 34a and 34b are formed at an angle of 45°.

As may be seen from FIG. 2, the first section 31 is formed with an annular cross-sectional area varying in the axial direction A of the mechanical seal assembly 1. Starting from the sliding surface 3a of the rotating slide ring 3, the cross-sectional area increases in the axial direction A toward the base portion 30a. At the outer diameter D1, a rectilinear change at a first angle α is thereby provided. At the inner diameter D2 of the first section 31, a rectilinear change in the inner diameter D2 is also provided at a second angle β. The respective angles α and β are different. The outer diameter D1, starting from the sliding surface 3a, changes into a constant outer diameter D1 approximately at the center of the first section 31. This reduces increase in cross-sectional area augmentation in the axial direction A up to the second section 32, since the inner diameter D2 decreases at a constant rate.

The first section 31 provides a quality function during a run-in process directly after the installation of new slide rings 3, 4, since it can especially compensate for any waviness of the slide rings due to relatively rapid abrasion of the first section 31.

As may be seen from FIG. 2, the second section 32 is directly adjacent to the first section 31. The second section 32 forms the so-called functional area of the wear area 30b of the rotating slide ring 3, in which a substantially constant sealing behavior of the mechanical seal 2 is to be achieved. Herein, the outer diameter D1 of the second section is constant and the inner diameter D2 of the second section 32 continuously decreases with a third angle γ in axial direction A. As a result, a load on the mechanical seal at the sliding surfaces 3a, 4a can be kept as constant as possible during service life, so that the sealing gap 5 between the sliding surfaces of the two slide rings 3, 4 remains substantially constant in the radial direction to the center axis X-X of the mechanical seal assembly.

The third section 33 directly adjoins the second section 32 in axial direction A. As may be seen from FIG. 2, a cross-sectional area of the third section 33 becomes smaller again in axial direction A. This confers a safety feature to the mechanical seal assembly, since it releases the seal when reaching maximum wear level, so that leakage increases. This can be used as an indicator that maintenance of the mechanical seal assembly is required shortly, for example within several hours or days, while replacing the slide rings, if required. If the mechanical seal 2 were to continue to operate, there is a risk that the stationary slide ring 4 would abut against a radially inwardly directed flange 8a of the slide ring carrier 8, which could lead to major damage to the mechanical seal assembly 1. Thus, the third section 33 is formed as a safety section to signal when maintenance or replacement of slide rings is necessary.

Preferably, the second section 32 is larger in the axial direction than the first section 31 and the third section 33. Further preferably, in the axial direction A, the first section 31 and the third section 33 are equal in size. Particularly preferably, the second section 32 of a total length of the wear area 30b in the axial direction A is at least 80%, preferably at least 85%, more preferably at least 90%.

For protection of the sliding surface 3a of the rotating slide ring 3, especially during handling of the slide rings, the production-related chamfers 34a, 34b may be provided.

Thus, a targeted wear behavior of the mechanical seal 2 can be realized by a non-cylindrical design of the wear area 30b. As a result, especially a sealing hydraulic of the mechanical seal 2 can remain constant during the complete service life, which especially also has a positive effect on the service life of the mechanical seal 2, since the sealing gap 5 between the rotating slide ring 3 and the stationary slide ring 4 substantially remains constant during the complete service life, thus assuring a longer service life. The problem encountered in prior art of the sealing gap 5 deforming in the direction of an A (so-called A-gap) or in the direction of a V (V-gap) can thus be prevented, which is beneficial to the service life of the slide ring seal.

FIG. 3 shows a mechanical seal assembly 1 according to a second example embodiment of the invention. Equal or functionally equal parts are identified by the same reference numbers.

As may be seen from FIG. 3, the second example embodiment essentially corresponds to the first example embodiment, although, contrary to the first example embodiment, the wear area 30b has a different configuration.

As may be seen from FIG. 3, starting from the sliding surface 3a of the rotating slide ring 3 at the outer diameter D1, the first section 31 is first formed with an arcuate portion having a first radius R1. The arcuate portion merges into a cylindrical section still within the first section 31. At the inner diameter D2, starting from the sliding surface 3a in the first section 31, the inner diameter D2 likewise transitions directly into an arcuate area with a second radius R2.

Small chamfers 34a, 34b are again formed at the transition between the sliding surface 3a and the outer diameter D1 and the inner diameter D2.

In the second example embodiment, the second section 32 is formed with a constant outer diameter D1 and a constant inner diameter D2, so that it is ring-cylindrical across its entire length in the axial direction A. The third section 33 is again formed with a reducing cross-sectional area, similar to the first example embodiment, wherein herein the outer diameter D1 decreases to the same extent as the inner diameter D2 increases.

FIG. 4 shows a mechanical seal assembly according to a third example embodiment, again with equal or functionally equal parts being identified similar to the first examples.

In the third example embodiment, the wear area 30b is again formed to be different from the preceding examples.

As may be seen from FIG. 4, the first section 31 is provided with different geometries at the outer diameter D1 and the inner diameter D2 and different angles α and β, as in the first example embodiment. At the second section 32, an arcuate shape corresponding to a parabolic load is formed at the outer diameter. At the inner diameter D2, the inner diameter D2 is formed to be constant at the second section 32. The outer diameter D1 changes from the second section 32 to a cylindrical area in the third section 33. The inner diameter D2 is linearly reduced in the axial direction A in the third section 33, so that in operation, when the wear area 30b is worn out so as to become the third section 33, the sliding surface 3a of the rotating slide ring 3 continuously increases, causing increased leakage at the sealing gap 5. This finally becomes the safety indicator indicating that the mechanical seal should be replaced or restored to prevent the stationary slide ring 4 from tarnishing at the flange 8a.

FIG. 5 shows a mechanical seal assembly with a rotating slide ring 3 according to a fourth example embodiment of the invention. In turn, equal or functionally equal parts are identified with the same reference numbers. In contrast to the preceding examples embodiment, the rotating slide ring 3 with the wear area 30b of the fourth example embodiment has a constant distance between the outer diameter D1 and the inner diameter D2. This will be achieved by the fact that the three sections 31, 32, 33, as seen individually, are each provided as parallelograms the sides of which directed in the radial direction R of the mechanical seal are each of the same length. In this way, individual adaptation of wear behavior of the mechanical seal 2 and modeling of the forces occurring at the sealing gap between the sliding surfaces may also be achieved.

In the fourth example embodiment, both the outer diameter D1 and the inner diameter D2 also continuously change in the axial direction A starting from the sliding surface 3a.

LIST OF REFERENCE NUMBERS 1 mechanical seal assembly
2 mechanical seal
3 rotating slide ring
3a sliding surface of rotating slide ring
4 stationary slide ring
4a sliding surface of stationary slide ring
5 sealing gap
6 pretensioning device
7 shaft
8 slide ring carrier
8a slide ring carrier flange
9 housing
11 product area
12 atmosphere area
13 secondary seal
30a rotating slide ring base area
30b rotating slide ring wear area
31 first section
32 second section
33 third section
34a first chamfer
34b second chamfer
A axial direction
D1 outer diameter D2 inner diameter
R radial direction
R1 first radius
R2 second radius
X-X mechanical seal assembly center axis
α first angle
β second angle
γ third angle

The invention claimed is:

1. A mechanical seal assembly comprising:
a mechanical seal including a rotating slide ring having a sliding surface and a stationary slide ring having a sliding surface defining a sealing gap therebetween,
wherein one of the slide rings is designed as a wearing slide ring having a hardness lower than the other one of the slide rings,
said wearing slide ring having a base area and a wear area, and
wherein the wear area at least partially has a non-cylindrical area in an axial direction of the mechanical seal assembly,
wherein the wear area has a first section which adjoins a sliding surface of the wearing slide ring and has an annular cross-sectional area which changes in the axial direction,
wherein an outer diameter of the first section increases at a first angle α and an inner diameter of the first section decreases in the axial direction at a second angle β, which is different from the first angle α,
wherein the wear area has a second section which directly adjoins the first section in the axial direction, and a third section which directly adjoins the second section in the axial direction; and
wherein at least one of the first, second or third sections linearly increases in the axial direction at the outer diameter and/or wherein at least one of the first, second or third sections linearly decreases in the axial direction at the inner diameter.

2. The mechanical seal assembly according to claim 1, wherein the non-cylindrical portion of the wear area has a varying annular cross-sectional area in the axial direction of the mechanical seal assembly such that at least one of an outer diameter of the wear area and an inner diameter of the wear area varies in the axial direction.

3. The mechanical seal assembly according to claim 1, wherein the wear area has a partially cylindrical area or wherein the outer diameter and/or the inner diameter of the wear area continuously change in the axial direction.

4. The mechanical seal assembly according to claim 1, wherein the second section of the wear area has an annular cross-sectional area changing in the axial direction, or which has a constant cross-sectional area in the axial direction.

5. The mechanical seal assembly according to claim 1, wherein the third section of the wear area has an annular cross-sectional area varying in axial direction.

6. The mechanical seal assembly according to claim 5, wherein the cross-sectional area of the third section decreases in the axial direction.

7. The mechanical seal assembly according to claim 1, wherein the first section has a cross-sectional area which widens in the axial direction starting from the sliding surface.

8. The mechanical seal assembly according to claim 1, wherein the outer diameter, in at least one section, linearly changes in the axial direction or wherein the outer diameter, in at least one section, arcuately changes in the axial direction and/or wherein the inner diameter, in at least one section, linearly changes in the axial direction or wherein the inner diameter, in at least one section, arcuately changes in the axial direction.

9. The mechanical seal assembly according to claim 1, wherein a first chamfer is formed at the transition between the sliding surface of the rotating slide ring and the wear area on the outer diameter and a second chamfer is formed on the inner diameter.

10. The mechanical seal assembly according to claim 1, wherein the wearing slide ring is made of a material comprising graphite and/or carbon.

11. The mechanical seal assembly according to claim 1, wherein the wear area comprises at least one section the cross-sectional area of which remains constant in the axial direction.

* * * * *